United States Patent
Michelin et al.

(10) Patent No.: US 11,043,208 B1
(45) Date of Patent: Jun. 22, 2021

(54) SYSTEMS AND METHODS FOR MIXED SETTING TRAINING FOR SLOT FILLING MACHINE LEARNING TASKS IN A MACHINE LEARNING TASK-ORIENTED DIALOGUE SYSTEM

(71) Applicant: Clinc, Inc., Ann Arbor, MI (US)

(72) Inventors: Daniel C. Michelin, Ann Arbor, MI (US); Jonathan K. Kummerfeld, Ann Arbor, MI (US); Kevin Leach, Ann Arbor, MI (US); Stefan Larson, Ann Arbor, MI (US); Joseph J. Peper, Ann Arbor, MI (US); Yunqi Zhang, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 17/180,112

(22) Filed: Feb. 19, 2021

Related U.S. Application Data (60) Provisional application No. 62/979,092, filed on Feb. 20, 2020, provisional application No. 63/151,324, filed on Feb. 19, 2021.

(51) Int. Cl.
*G10L 15/06* (2013.01)
*G06F 40/35* (2020.01)
*G06N 20/00* (2019.01)

(52) U.S. Cl.
CPC ........... *G10L 15/063* (2013.01); *G06F 40/35* (2020.01); *G06N 20/00* (2019.01); *G10L 2015/0636* (2013.01)

(58) Field of Classification Search
CPC ......... G10L 15/063; G10L 2015/0636; G06N 20/00; G06F 40/35
See application file for complete search history.

(56) References Cited

U.S. PATENT DOCUMENTS

| | | | |
|---|---|---|---|
| 6,349,276 B1* | 2/2002 | McCarley | G06F 40/58 704/8 |
| 10,521,189 B1* | 12/2019 | Ryabov | G06F 40/289 |
| 10,812,424 B1* | 10/2020 | Bommaraju | G06N 5/003 |
| 10,867,245 B1* | 12/2020 | Farhady Ghalaty | G06N 3/04 |
| 2011/0055256 A1* | 3/2011 | Phillips | G10L 15/30 707/769 |

(Continued)

*Primary Examiner* — Michael Colucci
(74) *Attorney, Agent, or Firm* — Padowithz Alce; Alce PLLC (57) ABSTRACT

Systems and methods for intelligently training a subject machine learning model includes identifying new observations comprising a plurality of distinct samples unseen by a target model during a prior training; creating an incremental training corpus based on randomly sampling a collection of training data samples that includes a plurality of new observations and a plurality of historical training data samples used in the prior training of the target model; implementing a first training mode that includes an incremental training of the target model using samples from the incremental training corpus as model training input; computing performance metrics of the target model based on the incremental training; evaluating the performance metrics of the target model against training mode thresholds; and selectively choosing based on the evaluation one of maintaining the first training mode and automatically switching to a second training mode that includes a full retraining of the target model.

20 Claims, 8 Drawing Sheets

(56) References Cited

U.S. PATENT DOCUMENTS

| | | | |
|---|---|---|---|
| 2012/0290293 A1* | 11/2012 | Hakkani-Tur | G06F 16/951 704/9 |
| 2016/0196820 A1* | 7/2016 | Williams | G06F 3/167 704/244 |
| 2017/0293676 A1* | 10/2017 | Lowe | G06F 16/93 |
| 2019/0349320 A1* | 11/2019 | Karuppusamy | G06Q 10/107 |
| 2019/0385595 A1* | 12/2019 | Wabgaonkar | G06F 40/35 |
| 2020/0294489 A1* | 9/2020 | Ding | G10L 15/26 |
| 2020/0312299 A1* | 10/2020 | Nama | G06F 16/3329 |
| 2021/0065680 A1* | 3/2021 | Audhkhasi | G10L 15/16 |

\* cited by examiner

```
┌─────────────────────────────────────────────────────┐
│      Identifying New Observations Data S210         │
└─────────────────────────────────────────────────────┘

┌─────────────────────────────────────────────────────┐
│    Running Observations Through a Sampling S220     │
└─────────────────────────────────────────────────────┘

┌─────────────────────────────────────────────────────┐
│   Performing an Incremental Training of the Model S230 │
└─────────────────────────────────────────────────────┘

┌─────────────────────────────────────────────────────┐
│     Evaluating the Incrementally Trained Model S240 │
└─────────────────────────────────────────────────────┘

┌─────────────────────────────────────────────────────┐
│       Decisioning Whether to Fully Train S250       │
└─────────────────────────────────────────────────────┘
```

SYSTEMS AND METHODS FOR MIXED SETTING TRAINING FOR SLOT FILLING MACHINE LEARNING TASKS IN A MACHINE LEARNING TASK-ORIENTED DIALOGUE SYSTEM

CROSS-REFERENCE TO RELATED APPLICATIONS

This application claims the benefit of U.S. Provisional Application No. 62/979,092, filed 20 Feb. 2020, and U.S. Provisional Application No. 62/987,488, filed 10 Mar. 2020, which are incorporated in their entireties by this reference.

GOVERNMENT RIGHTS

The subject matter of the invention may be subject to U.S. Government Rights under National Science Foundation grants: NSF SBIR Phase 1 Grant—1622049 and NSF SBIR Phase 2 Grant—1738441.

TECHNICAL FIELD

The inventions herein relate generally to the virtual assistant field, and more specifically to a new and useful system and method for implementing an artificially intelligent assistant using machine learning in the virtual assistant field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Therefore, there is a need in the virtual assistant field for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

BRIEF SUMMARY OF THE INVENTION

In one embodiment, a method for an intelligent incremental retraining or non-deterministic full retraining of a slot-filling machine learning model includes: identifying new observations comprising a plurality of distinct utterance samples unseen by a target slot-filling machine learning model during a prior training; creating an incremental training corpus based on randomly sampling a collection of utterance training data samples that includes (a) a plurality of new observations and (b) a plurality of historical utterance training data samples used in the prior training of the target slot-filling machine learning model; implementing an incremental training of the target slot-filling machine learning model using utterance samples from the incremental training corpus as model training input; computing one or more performance metrics of the target slot-filling machine learning model based on the incremental training; evaluating the one or more performance metrics of the target slot-filling machine learning model against one or more training mode thresholds; and selectively choosing one of (i) the incremental training of the target slot-filling machine learning model and (ii) a full retraining of the target slot-filling machine learning model based on the evaluation.

In one embodiment, a previously-learned weight coefficient matrix of the target slot-filling machine learning model is maintained at an initiating a training epoch and updated during the training epoch based on the incremental training with the incremental training corpus.

In one embodiment, the incremental training relates to an abbreviated retraining of a pre-existing machine learning model using only a partial training corpus that includes a plurality of distinct utterance training samples seen by the pre-existing model during a historical training and a plurality of new utterance training samples unseen by the pre-existing model during the historical training.

In one embodiment, computing one or more performance metrics of the target slot-filling machine learning model includes computing an $F_1$ test score for the target slot-filling machine learning model after the incremental training.

In one embodiment, one of the one or more training mode thresholds includes a minimum $F_1$ test score value derived based on a historical $F_1$ test score of the target slot-filling machine learning computed based on the prior training; and evaluating the one or more performance metrics of the target slot-filling machine learning model includes: evaluating the $F_1$ test score for the target slot-filling machine learning model includes identifying whether the $F_1$ test score exceeds the minimum $F_1$ test score value.

In one embodiment, if the $F_1$ test score for the target slot-filling machine learning model exceeds the minimum $F_1$ test score value, selectively choosing to maintain the incremental training of the target slot-filling machine learning model.

In one embodiment, if the $F_1$ test score for the target slot-filling machine learning model does not exceed the minimum $F_1$ test score value, selectively choosing to switch a training mode from the incremental training to the full retraining of the target machine learning model.

In one embodiment, if the one or more performance metrics of the target slot-filling machine learning model satisfy or exceed the one or more training mode thresholds, selectively choosing to maintain the incremental training of the target slot-filling machine learning model and maintain associated incrementally trained weight parameters of the target slot-filling machine learning model.

In one embodiment, if the one or more performance metrics of the target slot-filling machine learning model do not satisfy or do not exceed the one or more training mode thresholds, selectively choosing to switch a training mode from the incremental training to the full retraining of the target machine learning model and discard associated incrementally trained weight parameters of the target slot-filling machine learning model.

In one embodiment, the randomly sampling the collection of utterance training data samples includes: sampling a first distinct corpus comprising the plurality of new observations, and sampling a second distinct corpus comprising the plurality of historical utterance training data samples used in the prior training of the target slot-filling machine learning model.

In one embodiment, the incremental training of the target slot-filling machine learning model relates to a tentative incremental training mode, and if the one or more performance metrics of the target slot-filling machine learning model satisfy or exceed the one or more training mode thresholds, the tentative incremental training mode becomes validated.

In one embodiment, the incremental training of the target slot-filling machine learning model relates to a tentative incremental training mode, and if the one or more performance metrics of the target slot-filling machine learning model do not satisfy or do not exceed the one or more training mode thresholds, the tentative incremental training mode becomes invalidated.

In one embodiment, the target slot-filling machine learning model extracts one or more distinct tokens from an utterance input and predicts a slot label for each of the one or more distinct tokens that a machine learning task-oriented dialogue system is able to process to produce a response to the utterance input.

In one embodiment, a method for intelligently training a subject machine learning model between a first incremental training mode and a second full retraining mode incremental includes identifying new observations comprising a plurality of distinct samples unseen by a target machine learning model during a prior training; creating an incremental training corpus based on randomly sampling a collection of training data samples that includes (a) a plurality of new observations and (b) a plurality of historical training data samples used in the prior training of the target machine learning model; implementing a first training mode that includes an incremental training of the target machine learning model using samples from the incremental training corpus as model training input; computing one or more performance metrics of the target machine learning model based on the incremental training; evaluating the one or more performance metrics of the target machine learning model against one or more training mode thresholds; and selectively choosing based on the evaluation one of (i) maintain the first training mode and (ii) automatically switching to a second training mode that includes a full retraining of the target machine learning model.

In one embodiment, a previously-learned weight coefficient matrix of the target machine learning model is maintained at an initiating a training epoch and updated during the training epoch based on the incremental training with the incremental training corpus.

In one embodiment, the incremental training relates to an abbreviated retraining of a pre-existing machine learning model using only a partial training corpus that includes a plurality of distinct training samples seen by the pre-existing model during a historical training and a plurality of new training samples unseen by the pre-existing model during the historical training.

In one embodiment, computing one or more performance metrics of the target machine learning model includes computing an $F_1$ test score for the target machine learning model after the incremental training.

In one embodiment, one of the one or more training mode thresholds includes a minimum $F_1$ test score value derived based on a historical $F_1$ test score of the target machine learning computed based on the prior training; and evaluating the one or more performance metrics of the target machine learning model includes: evaluating the $F_1$ test score for the target machine learning model includes identifying whether the $F_1$ test score exceeds the minimum $F_1$ test score value.

In one embodiment, if the $F_1$ test score for the target slot-filling machine learning model exceeds the minimum $F_1$ test score value, selectively choosing to maintain the first training mode of the target machine learning model.

In one embodiment, if the $F_1$ test score for the target machine learning model does not exceed the minimum $F_1$ test score value, selectively choosing to switch a training mode from the first training mode to the second training mode for a full retraining of the target machine learning model.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly-defined intents. This inflexible structure cannot reasonably and efficiently address the many variances in the manners in which a user may pose a query or command to the virtual assistant.

The embodiments of the present application, however, provide artificial intelligence virtual assistant platform and natural language processing capabilities that function to process and comprehend structured and/or unstructured natural language input from a user. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly-defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Mixed Training Overview

Model training remains a dominant financial cost and time investment in machine learning applications. Developing and debugging models often involve iterative training, further exacerbating this issue. With growing interest in increasingly complex models, there is a need for techniques that help to reduce overall training effort. While incremental training can save substantial time and cost by training an existing model on a small subset of data, little work has explored policies for determining when incremental training provides adequate model performance versus full retraining. One or more embodiments of the present application provide a method-agnostic technique for automated decisioning regarding when to incrementally train versus fully train a subject model when new observations have been detected. In some embodiments, the setting of non-deterministic full or incremental training may be referred to herein as mixed-setting training. One or more technical benefits of the mixed-setting training described herein includes providing a bounded error, an avoidance of catastrophic forgetting by the model, and a resultant significant speedup over a model training policy of always fully training.

1. System for Implementing an Artificially Intelligent Virtual Assistant

Figure 1:
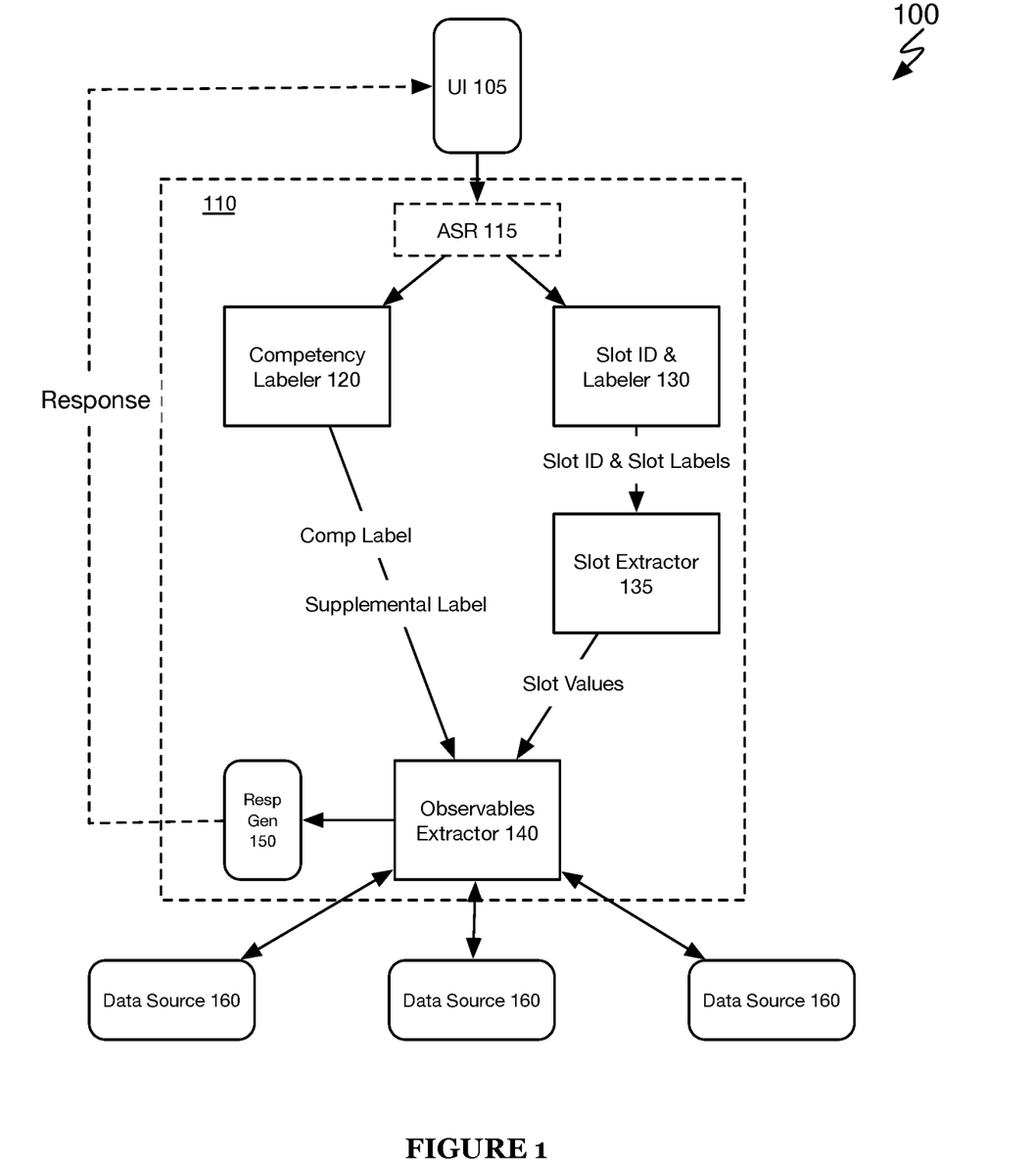
FIG. 1 illustrates a schematic representation of a system in accordance with one or more embodiments of the present application.

As shown in FIG. 1, a system 100 that implements an artificially intelligent virtual assistant includes an artificial intelligence (AI) virtual assistant platform 11o that includes a competency classification engine 120, a slot identification engine 130, a slot value extractor 135, an observables extractor 140, an artificial intelligence virtual assistant response generator 150, and data sources 160. The system 100 may additionally include an automatic speech recognition unit 115 and a user interface system 105.

Figure 3A:
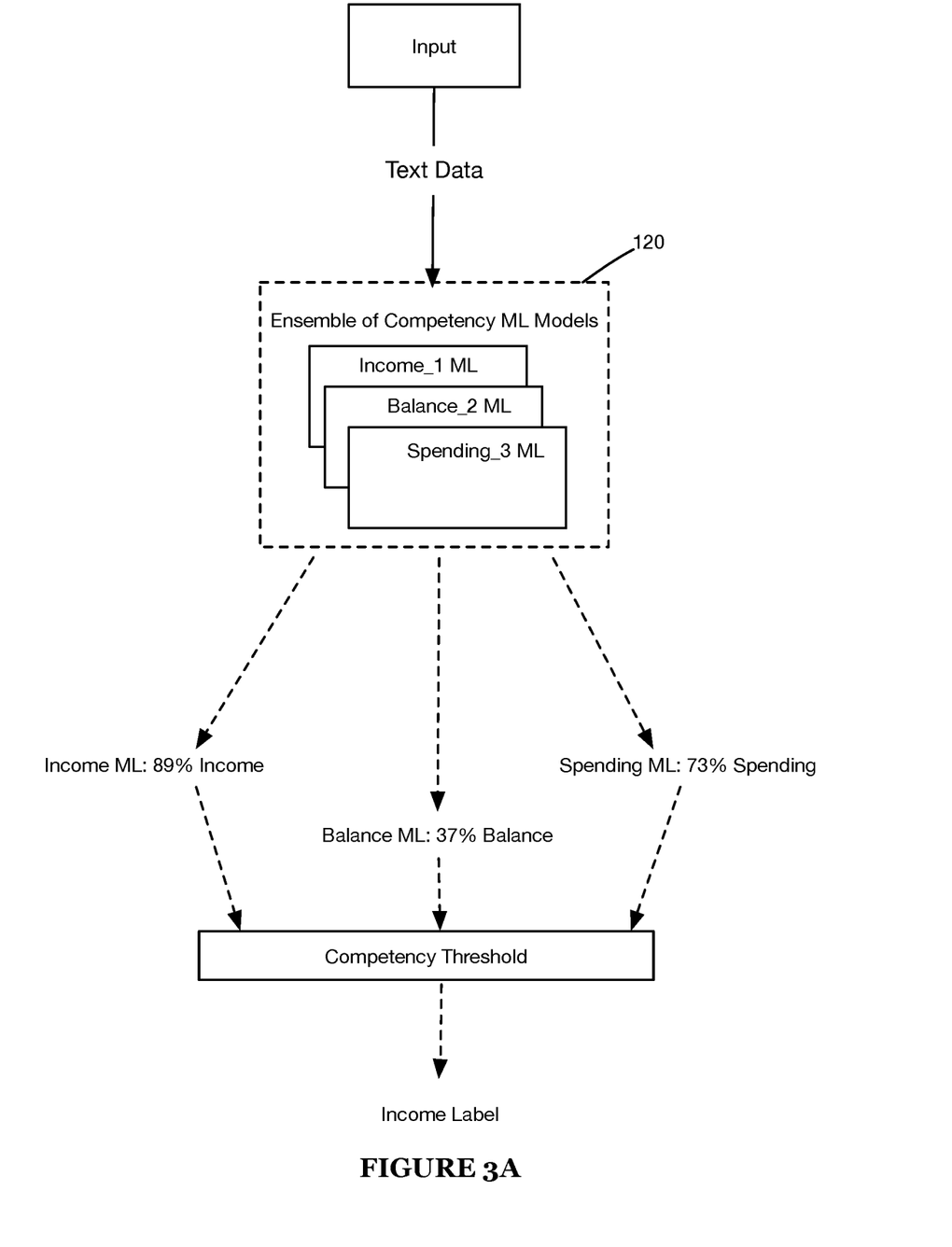
FIGS. 3A-3B illustrate example schematics for implementing portions of a method and a system in accordance with one or more embodiments of the present application.
Figure 3B:
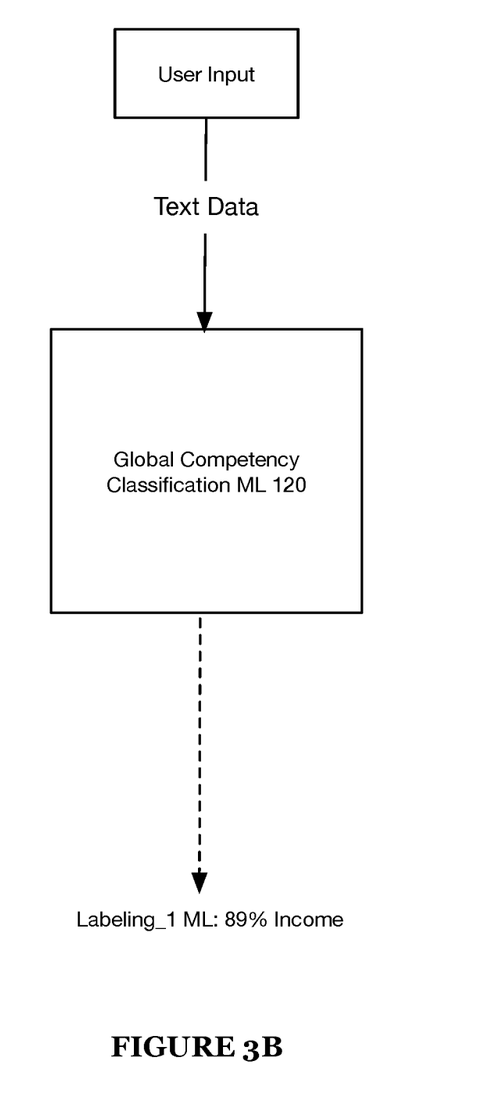
Figure 4:
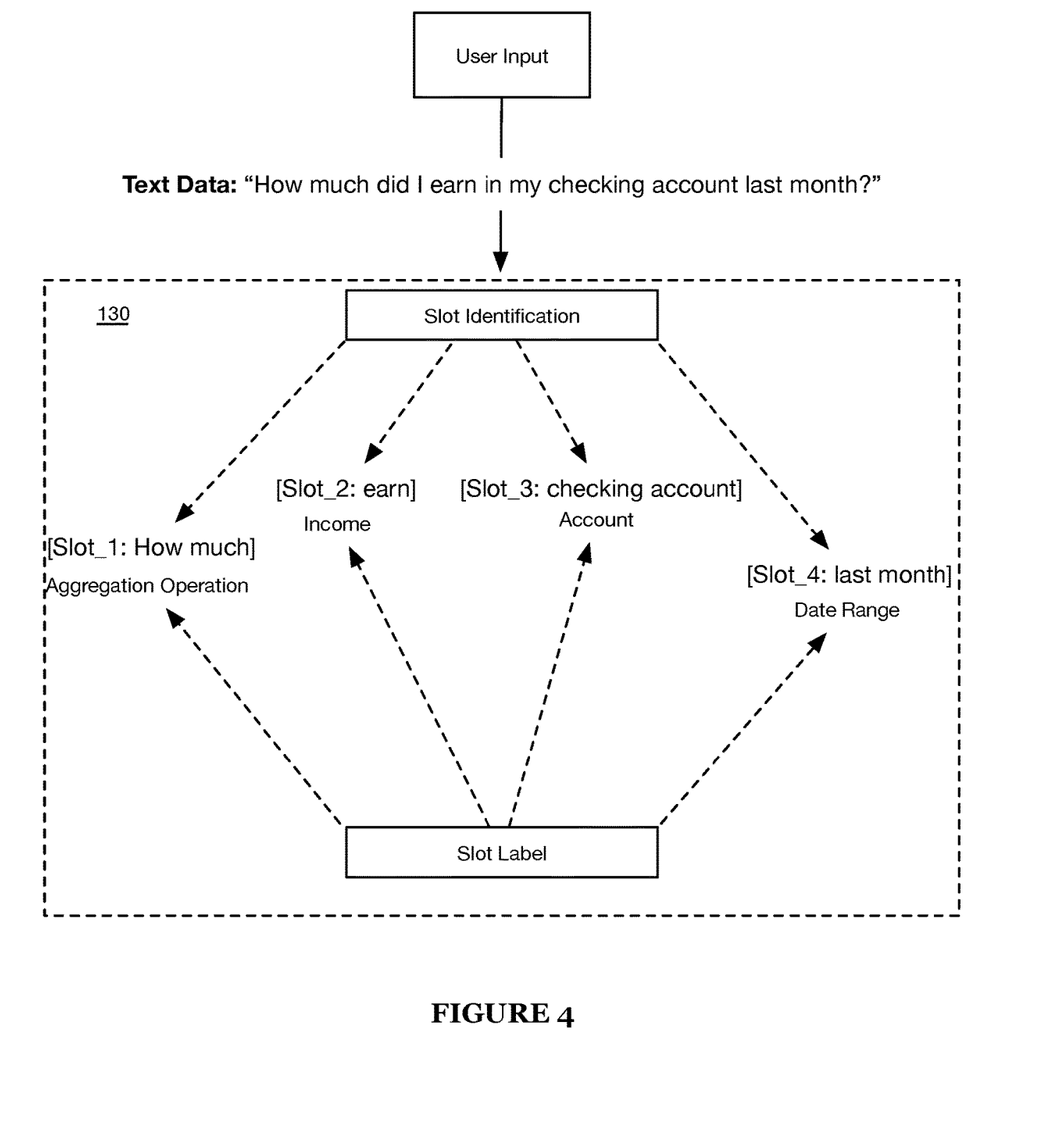
FIG. 4 illustrates an example schematic for implementing portions of a method and a system in accordance with one or more embodiments of the present application.
Figure 5:
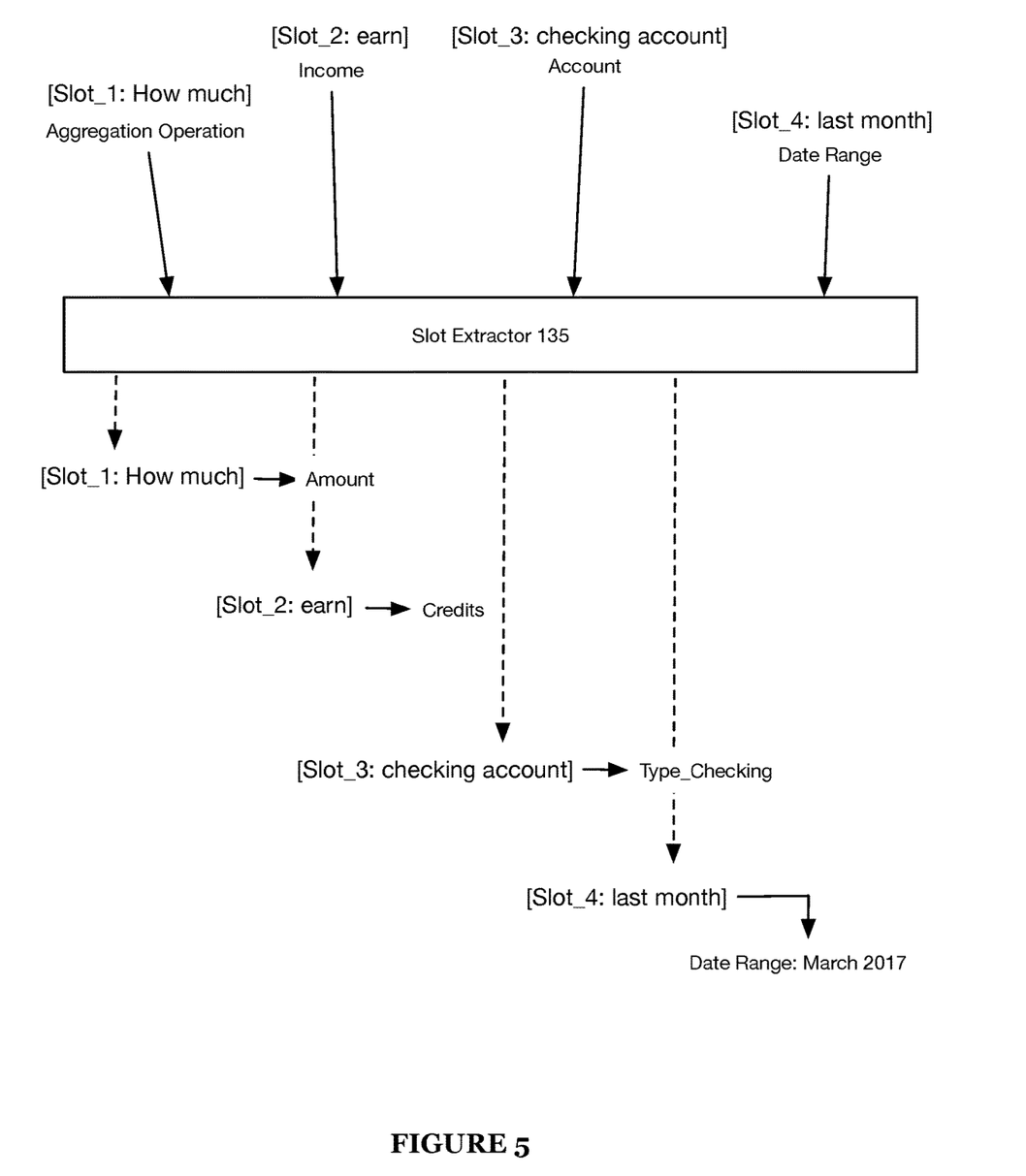
FIG. 5 illustrates an example schematic for implementing portions of a method and system in accordance with one or more embodiments of the present application.
Figure 6A:
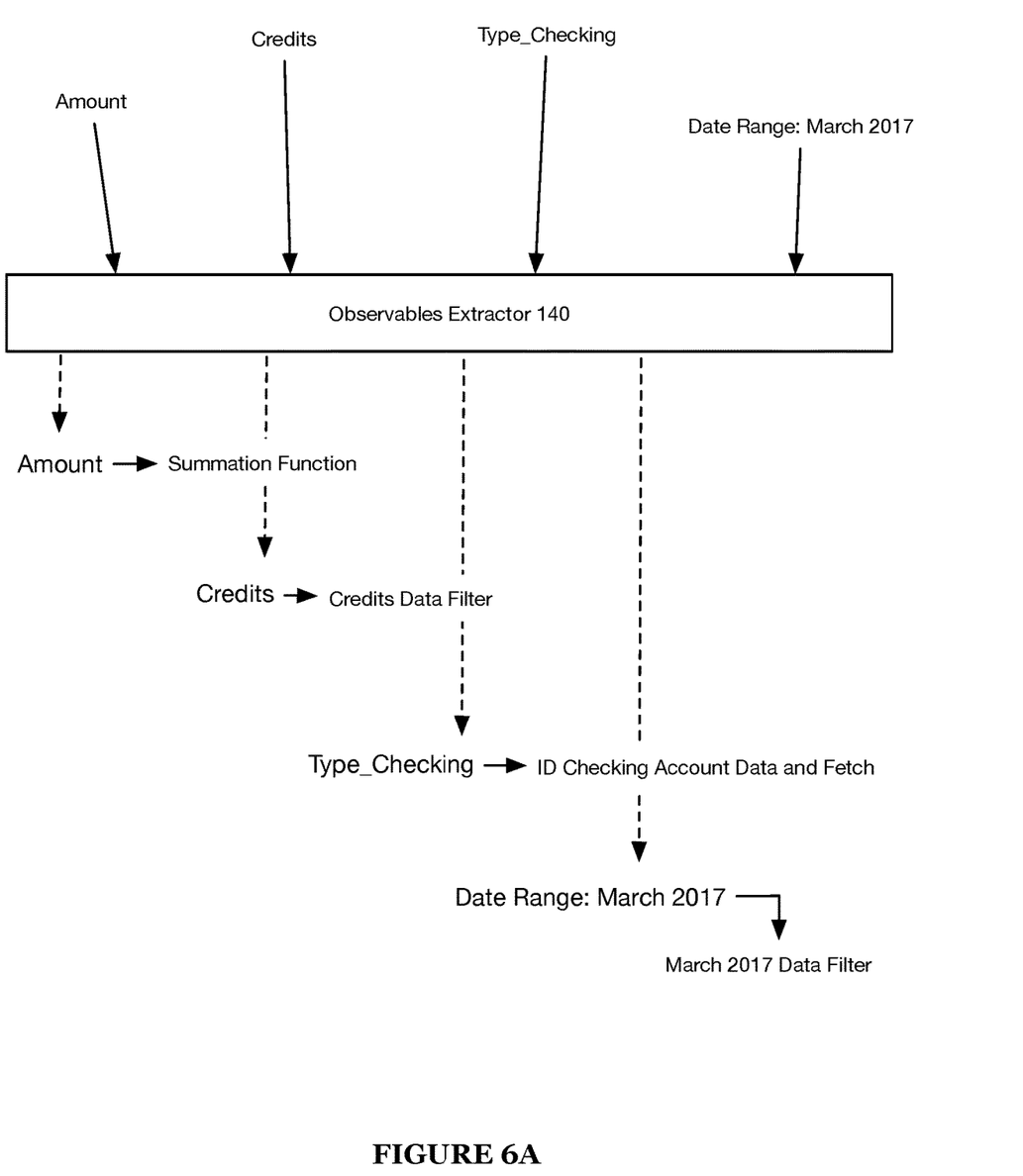
FIGS. 6A-6B illustrate an example schematic for implementing portions of a method and system in accordance with one or more embodiments of the present application.
Figure 6B:
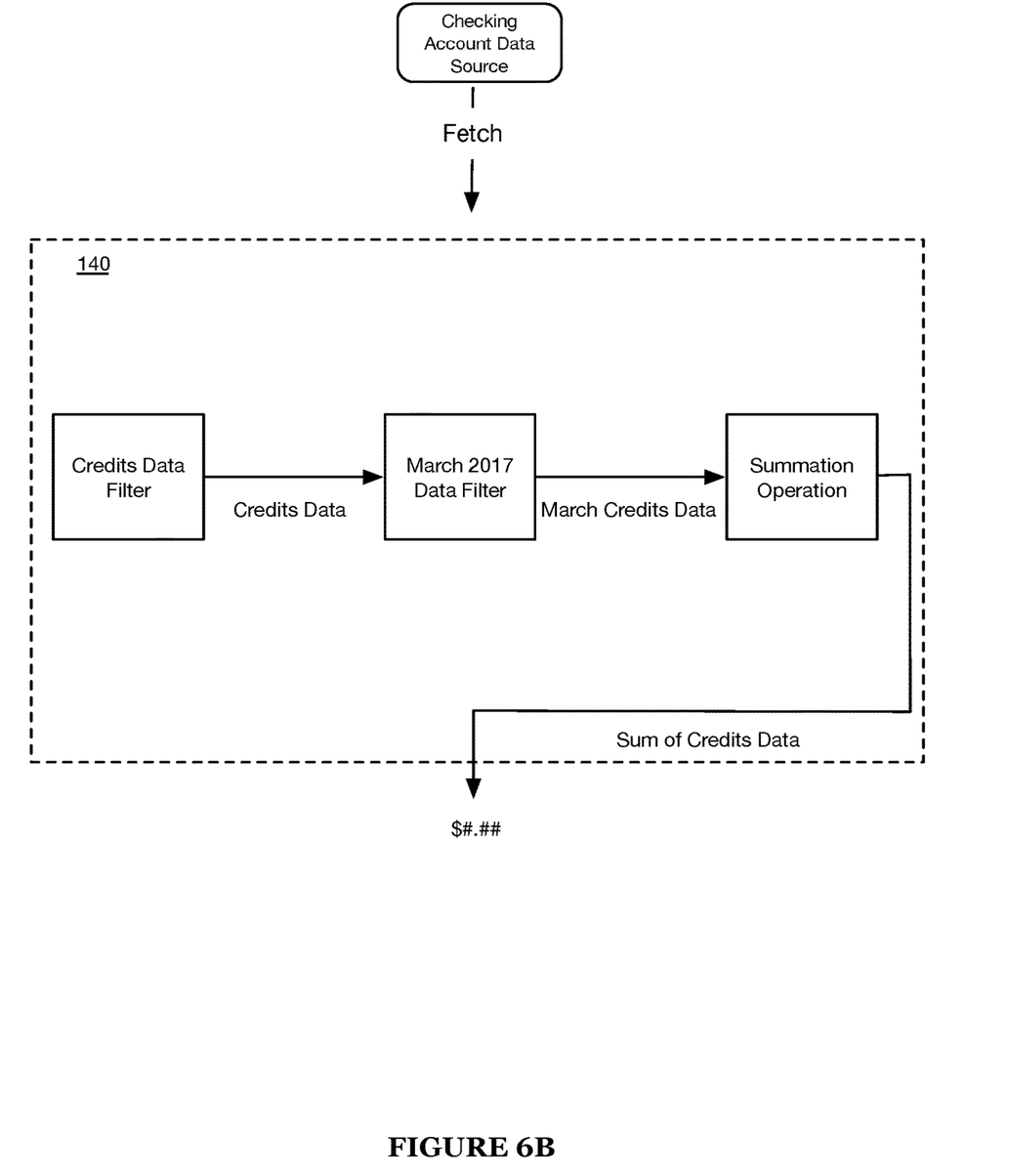

The system 100 functions to implement the artificial intelligence virtual assistant platform 11o to enable intelligent and conversational responses by an artificially intelligent virtual assistant to a user query and/or user command input into the system 100. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 may function to identify a competency classification label for the user input data, as shown by way of example in FIGS. 3A-3B, and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform no may be implemented via one or more specifically configured web or private computing servers (or a distributed computing system; e.g., the cloud) or any suitable system for implementing the system 100 and/or the method 200.

In some implementations, the artificial intelligence virtual assistant platform no may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 11o. Thus, the AI virtual assistant platform no may work in conjunction with the service provider to attend to the one or more queries and/or commands of the users of the service provider. In this implementation, the data sources 160 may be data sources of the service provider that are external data sources to the AI virtual assistant platform no.

The competency classification engine 120 together with the slot identification engine 130 and the slot value extractor 135 preferably function to define a natural language processing (NLP) component of the artificial intelligence platform 110 as described in U.S. Pat. No. 10,572,801, which is incorporated herein in its entirety by this reference. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowd-sourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were miss-predicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three ML algorithms from a total of nine ML algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to perform slot-filling tasks and identify slots or meaningful segments of user queries or user commands and to assign a slot classification label for each identified slot, as shown by way of example in FIGS. 4-6B. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). In some embodiments, a slot may relate to a one or more tokens defining a segment of an utterance or text that may function to inform a response by a machine learning task-oriented dialogue system to the utterance or text. Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to take into account the variations in a query or user command identified in the slot values. The response templates may generally be a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workboats, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Implementing Mixed Setting Training for Machine Learning Models

Figure 2:
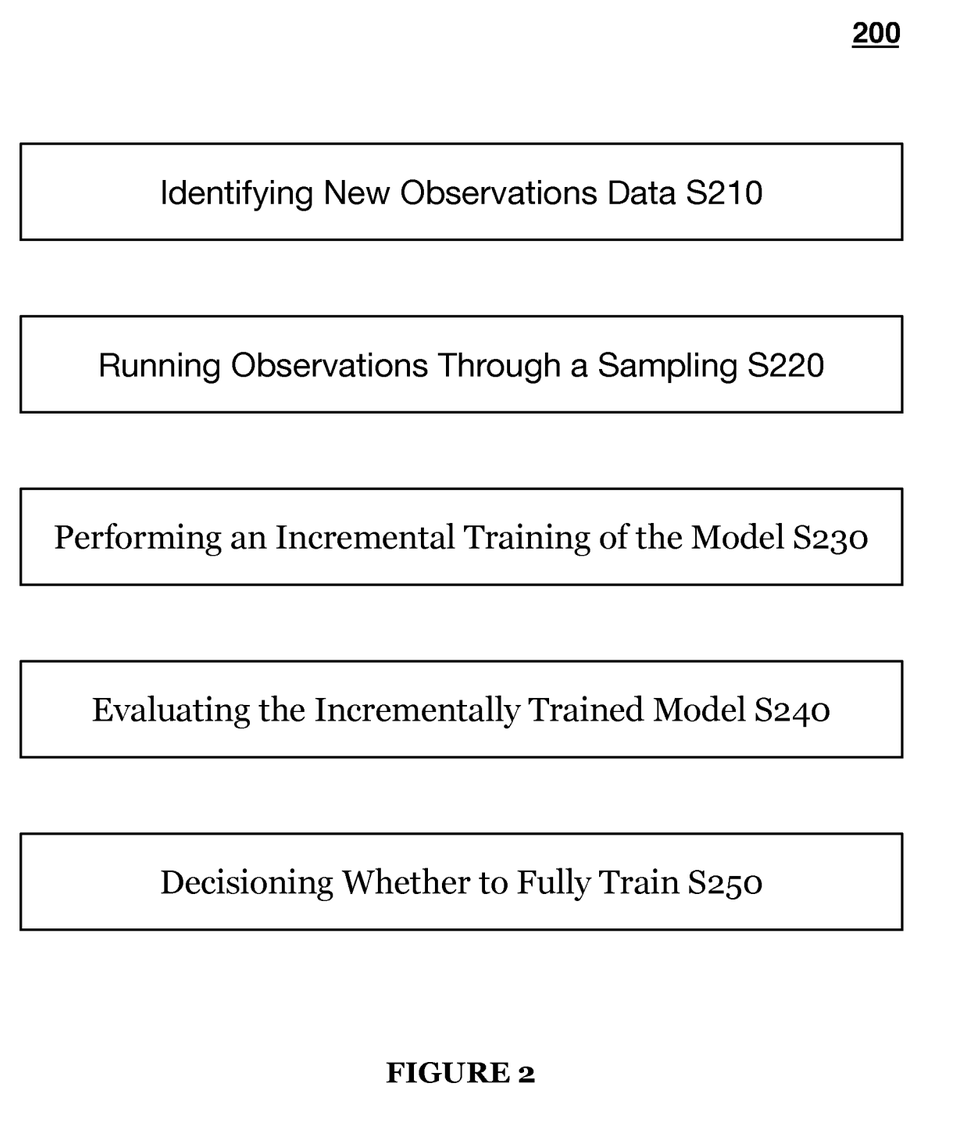
FIG. 2 illustrates an example method in accordance with one or more embodiments of the present application.

As shown in FIG. 2, a method 200 for implementing a mixed setting training of a machine learning model includes identifying new observations S210, running observations through a sampling module S220, performing an incremental training of the model S230, evaluating the incrementally trained model S240, and decisioning as to whether the incrementally trained model is sufficient S250.

The method 200 may function to implement an intelligent model training technique to reduce the cost, time, and/or effort involved in creating, updating, and refining or iterating machine learning models based on new observations of data (e.g., new training data samples, etc.). The method 200 in some embodiments assumes a pre-existing model for supporting a virtual dialogue agent.

Specifically, the method 200 may function to switch between training modes for a machine learning model based on a performance of the updated model as evaluated on a corpus of test training data that may be determined from historical and newly observed data. One training mode may include iterative training, which may include extending the model's inference and/or classification capabilities based on additional, novel, or newly available data or information that was previously unknown due to constraints that may include time or data storage limitations, based on some of the features, parameters, or attributes of the prior (e.g., pre-existing) model. A second training mode may include full training, or retraining, which may include a complete retraining of a model based on a set of training data that may include new and old observations, but and which may not retain or be based on any features, parameters, or attributes of a previously known or determined model. Full training may be more difficult or costly to perform, based on computational time and cost, than iterative training. However, full training may result in a higher quality or better-performing model. Therefore, it may be advantageous to be able to utilize both iterative and full training processes to reduce the cost and time of model development while maintaining model quality and/or performance.

The method 200 may additionally function to identify and/or extract a set of test training data on which to perform the evaluation. Such test training data may include certain preferred characteristics or representations of the historical and newly observed training data.

It may not be possible to know in apriori if an iteratively-trained model will meet or exceed desired performance thresholds or expectations. The method 200 functions to perform a post-hoc evaluation of the performance of an iteratively-trained model to determine if the model is acceptable or if further or a continued iteration or full retraining may be required or desired.

2.1 Identifying New Observations

S210, which includes collecting user input data, may function to receive user input data in any form. The user input data may include input that originates with or is provided by a user accessing, at least, part of a system (e.g., system 100) implementing the method 200. In one or more embodiments, the new training observations may be sourced from production and/or a live deployment of a target machine learning model in a machine learning-based dialogue system or the like. The user input data may include, but is not limited to, speech or utterance input, textual input, gesture input, touch input, image input, and/or any suitable or type of input. Preferably, the user input data comprises one of (or a combination of) an utterance input and a textual input. Additionally, the user input data preferably includes a query by the user or a command from the user.

As discussed or referenced herein, a new observation preferably relates a data set or a piece of (utterance) data on which a target machine learning model has not previously been trained.

In a first implementation the source of the new observation data in S210 may include proprietary data collected from deployed (i.e., in production) virtual agents in a production environment. For example, data from a system in use may be recorded and used for this purpose.

In another implementation, in the absence of a deployed virtual agent, or in the interest of broadening a dataset, data may be collected by means of requesting and recording new relevant interactions specific to the domain and type of data desired by the trainers of the model. This could include crowdsourcing data, hiring agents to perform novel interactions, or any other method of generating new data.

In a third implementation, data may be harvested from an existing corpus of data such as books, video or audio recordings, that were not specifically generated as training data, but nevertheless provide useful training material for the model.

New observations may be generated from any combination of data sources including those listed above and/or described in the various embodiments or implementations herein.

Regardless of data source, S210 include a preprocessing step for the new observation data to be used as an additional observation or sample for training a target machine learning model. Such preprocessing includes data formatting to be ingested by the training step, and labeling (either by a human, or in an automated or semi-automated manner) such that the desired output of the model is known.

2.2 Run Observations Through Sampling

S220, which includes sampling data from the previous and newly observed dataset, may function to create a subset of data on which to evaluate a performance of a subject model and determine model quality. That is, S220 may function to create a training corpus of utterance samples for iterative training epochs based on a sampling of a full training corpus comprising historical training data samples and new observations (i.e., newly acquired training data samples). In some embodiments, it may often not be feasible to evaluate the subject model on the entire dataset or full training corpus because of computing cost constraints, so any suitable sampling step may be required to perform a substantive evaluation of the subject model. In general, at least one of the goals of sampling may be to select a subset of data of a suitable size and distribution such that the subset of data sufficiently (e.g., that satisfies or exceeds a representation threshold) represents the entire or full training corpus of sample data without sacrificing a fidelity of an output of the subject machine learning model.

In one embodiment, S220 may function to sample from distinct training data corpora where at least one of the distinct training data corpora includes a training data corpus having historical training data samples that may have been used in training a target machine learning model and another one of the distinct training data corpora includes a training data corpus having only newly observed or newly sourced training data samples that have not been used in a previous training of the target or subject machine learning model.

In a preferred embodiment, S220 may function to implement a sampling using a sampling technique that includes Reservoir Sampling, which may be a class of algorithms for sampling a relatively small number of items or pieces of data from a dataset that is either very large (e.g., satisfying or exceeding a size threshold), of an unknown size, or one having limited accessibility. Accordingly, in such embodiments, Reservoir Sampling may provide an unbiased sample of the training dataset as a whole, enabling guarantees to be made about model performance. However, it shall be noted, as described in the implementations below, that any suitable sampling technique may be used for defining and/or forming a corpus of training data comprising a subset of newly observed data and data from a prior or pre-existing training corpus for the subject model (e.g., the pre-existing model).

In a second embodiment, S220 may function to build or define a test corpus of training data using any suitable unbiased sampling technique for evaluating an incrementally trained subject model. For instance, in one implementation, a random sampling of a combination of the newly observed data and a prior or pre-existing training corpus of a subject model may be performed in which S220 proportionally draw from both a newly observed data set and a pre-existing or prior (e.g., a historical) corpus of training data to define the test corpus of training data.

In a third embodiment, S220 may function to build or define a corpus of training data for incrementally training a subject model using any suitable biased sampling technique. In one non-limiting example, S220 may function to bias a test corpus of training data using a biased sampling technique for evaluating an incrementally trained subject model. For example, in one implementation, S220 may function to disproportionately sample from the pre-existing training corpus and the newly observed data that creates a test corpus of data that includes more or a disproportionately increased number of samples from the pre-existing training corpus.

That is, S220 may function to create a test corpus of data that is positively biased with samples from the pre-existing training corpus. for evaluating an incrementally trained model that creates incremental an alternative sampling technique may be used that biases the sampled data towards the original dataset.

In a fourth embodiment, a sampling technique that biases the sampled data towards the more recent or new observations may be used. S220 may function to build or define a corpus of training data for incrementally training a subject model using any suitable biased sampling technique. In one non-limiting example, S220 may function to bias a test corpus of training data using a biased sampling technique for evaluating an incrementally trained subject model. For example, in one implementation, S220 may function to disproportionately sample from the newly observed data set and the pre-existing training corpus that creates a test corpus of data that includes more or a disproportionately increased number of samples from the newly observed data set. That is, S220 may function to create a test corpus of data that is positively biased with samples from the newly observed data set.

It shall be known that any combination of suitable sampling may be used for sampling from old training data and newly observed data points for building an evaluative or test corpus of data in the sampling step.

2.3 Incremental Training

S230, which includes incrementally training a subject model using the prior and newly observed data, may function to train the subject model in an incremental manner such that the training includes training the subject model at least with the newly observed data to thereby improve the subject model and extend the model's utility by incorporating new observations into the model's training.

In a preferred embodiment, S230 may function to define a corpus of training data for training a subject machine learning model in S230 that comprises only data from a newly observed data set. Accordingly, the incremental training of the subject model may include a limited or intentionally constrained training of the subject model only over pieces of training data (e.g., newly observed data) that have not been previously used in a training of the subject model.

In this preferred embodiment, S230 may function to implement an initial training iteration of a subject machine learning model using an incremental training technique based on new observation data. In such preferred embodiment, an outcome of the initial training iteration may function to inform whether subsequent trainings of the subject machine learning model may be performed using continued incremental training or a full training. That is, training results of the initial training iteration based on the incremental training technique informs the selection between a continued or further incremental training of a subject machine learning model should be undertaken and whether a full training of the subject machine learning model should be undertaken with a full training corpus.

In a variant implementation, S230 may function to define a corpus of training data for training a subject model that comprises a combination of data sourced from the newly observed data set and a subset or sampling of data from a pre-existing corpus of training data for the subject model. In this variant implementation, the training corpus for the initial training iteration using an incremental technique may include a combination of newly observed training data samples and historical or previously trained on data samples.

2.4 Evaluation of Incrementally Trained Model

S240, which includes measuring and evaluating the incrementally-trained model, may function to evaluate and/or identify one or more performance metrics of an incrementally trained model (e.g., an updated subject model) based on one or more testing using one or more iterations of a test corpus of data curated in S220. In one or more embodiments, the incrementally trained model relates to a subject model after an initial incremental training with a new training dataset or a subset of corpus of training data.

2.4.1 Measuring Performance Metrics of an Incrementally Trained Model

S240, which may include S241, may function to measure one or more distinct metrics of performance of an incrementally trained model. The one or more distinct metrics preferably include at least a regression of the incrementally trained model and may additionally, or alternatively, include any performance metric for the incrementally trained model.

In a preferred embodiment, S241 may function to compute a performance metric value (e.g., an $F_1$ test score) that may relate to or may be indicative of an accuracy of the incrementally trained model.

Additionally, or alternatively, in one embodiment, S241 may function to identify a first or a historical measure of performance (e.g., an $F_1$ test score) of a subject model and further, compute a measure of performance of an incrementally trained model, which may be a derivative of the subject model. In such preferred embodiment, S241 may additionally or alternatively compute a difference or delta between the historical measure of performance of the subject model and a measure of performance of the incrementally trained model. In one or more embodiments, the computed delta of the measures of performance may be used in an evaluation of the incrementally trained model, as described in more detail below. Accordingly, the delta may reflect a difference in performance between the subject model before and after an incremental training.

It shall be known that S241 may function to compute or measure any suitable measure of performance, for example, a difference of differences, could be used to evaluate performance.

2.4.2 Evaluating Performance Metrics of the Incrementally Trained Model

S240, which may additionally include S243, may function to evaluate each of the one or more computed measures of performance against one or more standards, which may inform a training type selection or a decision for either incrementally training or fully training the subject model, as described in S250. The one or more standards preferably relate to one or more maximum threshold values (e.g., epsilon threshold) that if met or exceeded may function to indicate that a full training of an incrementally trained model may be required. Conversely, if the one or more maximum threshold values are not met by the performance metric value of the incrementally trained model, then it may be determined that the incremental training may be sufficient.

In a preferred embodiment, the performance metric of a given incrementally trained model may include an $F_1$ test score or predictive accuracy. In such preferred embodiment, S243 may obtain a difference value between a maximum $F_1$ test score (e.g., 100) and the computed $F_1$ test score of the incrementally trained model based on the computations in S241.

Accordingly, in one evaluation of the incrementally trained model, S243 may function to measure the computed difference value against a maximum test score threshold. In such embodiment, if the computed difference value satisfies or exceeds the maximum threshold, S250 may function to select a full training setting that switches a mode of training the incrementally trained model from an incrementally training to a fully training. However, in some embodiments, if the computed difference value does not satisfy or exceed the maximum threshold, S250 may function to maintain an incrementally training mode of a system (e.g., system 100) implementing the method 200.

In another implementation, S243 may function to obtain a computed performance metric value of the incrementally trained model. In one example, the computed performance metric may be an $F_1$ test score for the incrementally trained model. In such implementation, S243 may function to evaluate the $F_1$ test score, per se, against a minimum test score threshold value (e.g., a minimum $F_1$ test score). In such implementation, if the computed performance metric value ($F_1$ test score) satisfies or exceeds the minimum threshold value, then S250 may function to maintain an incrementally training mode of a system implementing the method 200. Otherwise, in one implementation, if the computed performance metric value does not satisfy the minimum threshold value, then S250 may function to select or switch to a fully training mode from an incrementally training mode of a system implementing the method 200. In one or more embodiments, a minimum test score threshold value may be informed by a current or most recent $F_1$ test score of the subject machine learning model computed or obtained prior to an incremental training of the subject model.

In one variation, S243 may obtain a computed performance metric value of the incrementally trained model and function to compare the computed performance metric value against performance continuum or spectrum. The performance continuum may include a plurality of distinct thresholds defining two or more distinct ranges of performance where each of the two or more ranges of performance along the continuum may be associated with one of a requirement or decision to fully train, a requirement to incrementally train for a subsequent session or turn, and accept an incrementally trained model (e.g., retain the incrementally trained model, do nothing, etc.).

2.5 Identifying a Training Model

S250, which includes identifying a training mode for training a subject machine learning model, may function to identify whether to continue an incremental training of the subject model or switch to a full training of the subject model based on an evaluation of the initial incremental training of the subject model (e.g., S24o, etc.).

In one or more embodiments, S250 may function to evaluate one or more computed performance metrics of a subject machine learning model after an initial incremental training epoch against one or more evaluation thresholds relating to an efficacy of the subject model and/or efficacy of an incremental training.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method for an intelligent incremental retraining or non-deterministic full retraining of a slot-filling machine learning model, the method comprising:
   identifying new observations comprising a plurality of distinct utterance samples unseen by a target slot-filling machine learning model during a prior training;
   creating an incremental training corpus based on randomly sampling a collection of utterance training data samples that includes (a) a plurality of new observations and (b) a plurality of historical utterance training data samples used in the prior training of the target slot-filling machine learning model;
   implementing an incremental training of the target slot-filling machine learning model using utterance samples from the incremental training corpus as model training input;
   computing one or more performance metrics of the target slot-filling machine learning model based on the incremental training;
   evaluating the one or more performance metrics of the target slot-filling machine learning model against one or more training mode thresholds; and
   selectively choosing one of (i) the incremental training of the target slot-filling machine learning model and (ii) a full retraining of the target slot-filling machine learning model based on the evaluation.

2. The method according to claim 1, wherein
   a previously-learned weight coefficient matrix of the target slot-filling machine learning model is maintained at an initiating a training epoch and updated during the training epoch based on the incremental training with the incremental training corpus.

3. The method according to claim 1, wherein
   the incremental training relates to an abbreviated retraining of a pre-existing machine learning model using only a partial training corpus that includes a plurality of distinct utterance training samples seen by the pre-existing model during a historical training and a plurality of new utterance training samples unseen by the pre-existing model during the historical training.

4. The method according to claim 1, wherein
   computing one or more performance metrics of the target slot-filling machine learning model includes computing an $F_1$ test score for the target slot-filling machine learning model after the incremental training.

5. The method according to claim 4, wherein:
   one of the one or more training mode thresholds includes a minimum $F_1$ test score value derived based on a historical $F_1$ test score of the target slot-filling machine learning computed based on the prior training; and
   evaluating the one or more performance metrics of the target slot-filling machine learning model includes:
      evaluating the $F_1$ test score for the target slot-filling machine learning model includes identifying whether the $F_1$ test score exceeds the minimum $F_1$ test score value.

6. The method according to claim 5, wherein
if the $F_1$ test score for the target slot-filling machine learning model exceeds the minimum $F_1$ test score value, selectively choosing to maintain the incremental training of the target slot-filling machine learning model.

7. The method according to claim 5, wherein
if the $F_1$ test score for the target slot-filling machine learning model does not exceed the minimum $F_1$ test score value, selectively choosing to switch a training mode from the incremental training to the full retraining of the target machine learning model.

8. The method according to claim 1, wherein
if the one or more performance metrics of the target slot-filling machine learning model satisfy or exceed the one or more training mode thresholds, selectively choosing to maintain the incremental training of the target slot-filling machine learning model and maintain associated incrementally trained weight parameters of the target slot-filling machine learning model.

9. The method according to claim 1, wherein
if the one or more performance metrics of the target slot-filling machine learning model do not satisfy or do not exceed the one or more training mode thresholds, selectively choosing to switch a training mode from the incremental training to the full retraining of the target machine learning model and discard associated incrementally trained weight parameters of the target slot-filling machine learning model.

10. The method according to claim 1, wherein
the randomly sampling the collection of utterance training data samples includes:
sampling a first distinct corpus comprising the plurality of new observations, and
sampling a second distinct corpus comprising the plurality of historical utterance training data samples used in the prior training of the target slot-filling machine learning model.

11. The method according to claim 1, wherein:
the incremental training of the target slot-filling machine learning model relates to a tentative incremental training mode, and
if the one or more performance metrics of the target slot-filling machine learning model satisfy or exceed the one or more training mode thresholds, the tentative incremental training mode becomes validated.

12. The method according to claim 1, wherein:
the incremental training of the target slot-filling machine learning model relates to a tentative incremental training mode, and
if the one or more performance metrics of the target slot-filling machine learning model do not satisfy or do not exceed the one or more training mode thresholds, the tentative incremental training mode becomes invalidated.

13. The method according to claim 1, wherein
the target slot-filling machine learning model extracts one or more distinct tokens from an utterance input and predicts a slot label for each of the one or more distinct tokens that a machine learning task-oriented dialogue system is able to process to produce a response to the utterance input.

14. A method for intelligently training a subject machine learning model between a first incremental training mode and a second full retraining mode incremental, the method comprising:
identifying new observations comprising a plurality of distinct samples unseen by a target machine learning model during a prior training;
creating an incremental training corpus based on randomly sampling a collection of training data samples that includes (a) a plurality of new observations and (b) a plurality of historical training data samples used in the prior training of the target machine learning model;
implementing a first training mode that includes an incremental training of the target machine learning model using samples from the incremental training corpus as model training input;
computing one or more performance metrics of the target machine learning model based on the incremental training;
evaluating the one or more performance metrics of the target machine learning model against one or more training mode thresholds; and
selectively choosing based on the evaluation one of (i) maintaining the first training mode and (ii) automatically switching to a second training mode that includes a full retraining of the target machine learning model.

15. The method according to claim 14, wherein
a previously-learned weight coefficient matrix of the target machine learning model is maintained at an initiating a training epoch and updated during the training epoch based on the incremental training with the incremental training corpus.

16. The method according to claim 14, wherein
the incremental training relates to an abbreviated retraining of a pre-existing machine learning model using only a partial training corpus that includes a plurality of distinct training samples seen by the pre-existing model during a historical training and a plurality of new training samples unseen by the pre-existing model during the historical training.

17. The method according to claim 14, wherein
computing one or more performance metrics of the target machine learning model includes computing an $F_1$ test score for the target machine learning model after the incremental training.

18. The method according to claim 17, wherein:
one of the one or more training mode thresholds includes a minimum $F_1$ test score value derived based on a historical $F_1$ test score of the target machine learning computed based on the prior training; and
evaluating the one or more performance metrics of the target machine learning model includes:
evaluating the $F_1$ test score for the target machine learning model includes identifying whether the $F_1$ test score exceeds the minimum $F_1$ test score value.

19. The method according to claim 17, wherein
if the $F_1$ test score for the target slot-filling machine learning model exceeds the minimum $F_1$ test score value, selectively choosing to maintain the first training mode of the target machine learning model.

20. The method according to claim 17, wherein
if the $F_1$ test score for the target machine learning model does not exceed the minimum $F_1$ test score value, selectively choosing to switch a training mode from the first training mode to the second training mode for a full retraining of the target machine learning model.

* * * * *

UNITED STATES PATENT AND TRADEMARK OFFICE
CERTIFICATE OF CORRECTION

PATENT NO. : 11,043,208 B1  
APPLICATION NO. : 17/180112  
DATED : June 22, 2021  
INVENTOR(S) : Daniel C. Michelin et al.

It is certified that error appears in the above-identified patent and that said Letters Patent is hereby corrected as shown below:

On the Title Page

Item (71) Applicant, Cline, Inc. should be "Clinc, Inc."

Signed and Sealed this
Twenty-ninth Day of August, 2023

Katherine Kelly Vidal
*Director of the United States Patent and Trademark Office*